N° 45,924

Samuel B. Haines
Improved Horse Power
Patented Jany. 17, 1865.

UNITED STATES PATENT OFFICE.

SAMUEL B. HAINES, OF LANCASTER, PENNSYLVANIA.

IMPROVEMENT IN HORSE-POWERS.

Specification forming part of Letters Patent No. 45,921, dated January 17, 1865.

*To all whom it may concern:*

Be it known that I, SAMUEL B. HAINES, of the city of Lancaster, county of Lancaster, and State of Pennsylvania, have invented an Improved Horse-Power, which I call the "Conical-Wheel Horse-Power;" and I do hereby declare that the following is a full and exact description thereof, reference being had to the accompanying drawings, and to the letters of reference marked thereon, making a part of this specification.

The nature of my invention consists in connecting the levers by rods, links, and hooks one to the other, likewise a cone-shaped pivot upon which the master-wheel operates, and its construction and shape as connected solid with bed-plate and stays attached to the gearing to keep it in line and firmly fixed to bed-frame underneath; likewise, lever cast-iron loops as shaped and cast solid with the master-wheel.

To enable others skilled in the art to make and use my invention, I will proceed to describe its construction and operation.

In the use of horse-powers with several radial arms or levers for attaching the horses it is found that a sudden jerk from one or two horses gives a violent side strain, which is liable to break the machine, and especially to break or throw out of place the central pivot or shaft of the main wheel.

The object of my improvement is to remedy these difficulties.

My invention consists in the use of peculiar yokes upon the radial levers and a large hollow conical pivot, with a bed-plate of peculiar construction.

Figure 2:
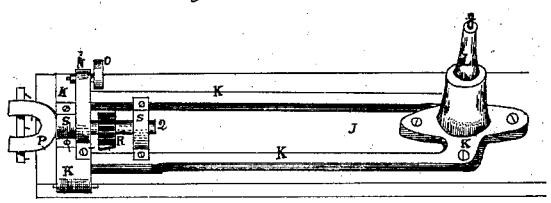
Figure 1:
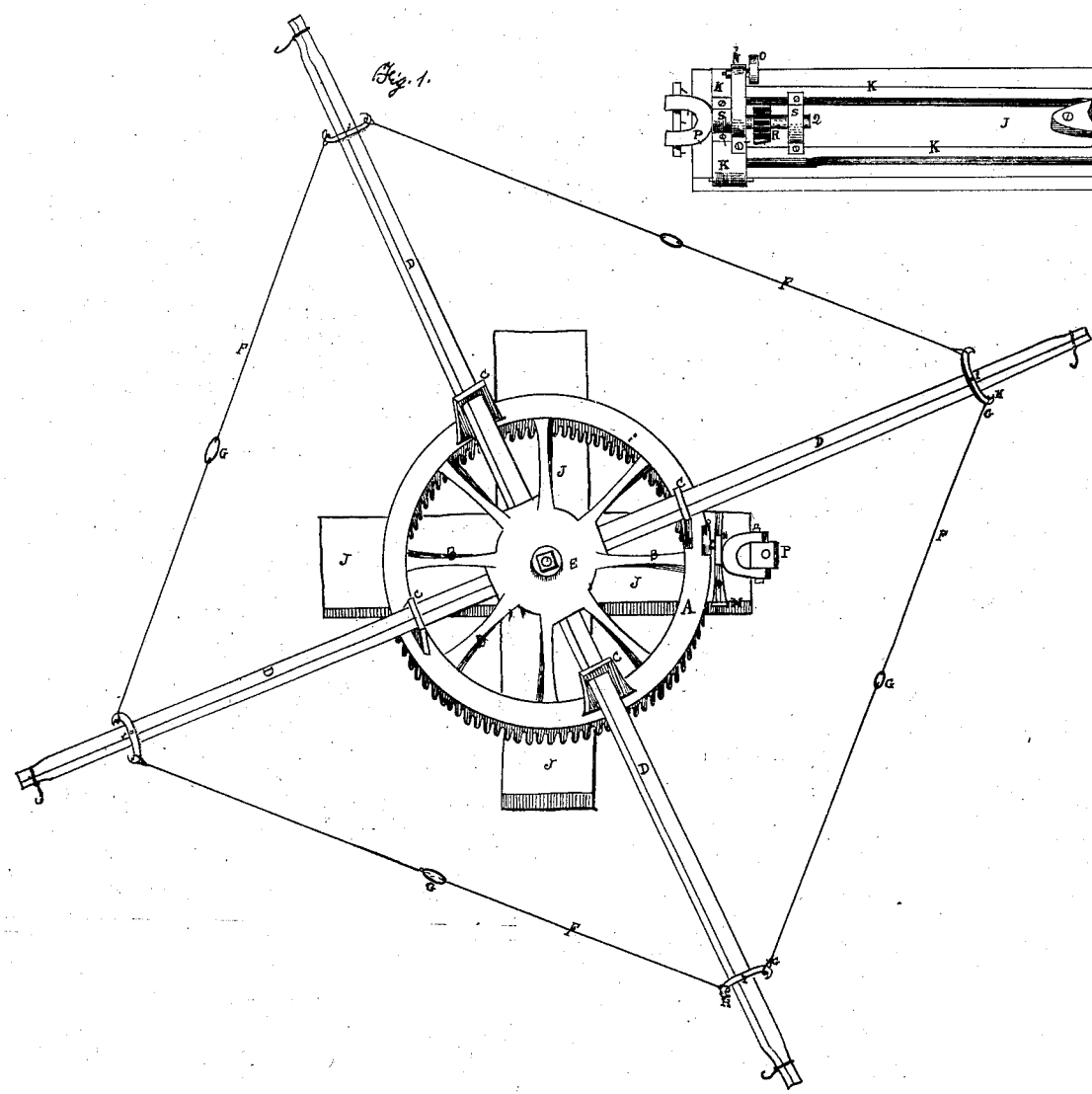

In the accompanying drawings, Figure 1 is a top view of my horse-power. Fig 2 is a perspective view of the conical pivot and bed-plate detached.

In constructing my machine I usually employ a common bed-frame, J J, for fastening the bed-plate K and the central pivot, L. Then the main wheel is arranged upon this pivot, as seen in Fig. 1 at A E. The levers D are placed in loops C and in sockets at the central hub in the usual manner. These levers are connected by chains F G, which are attached to yokes H. The yokes are pivoted upon the levers so as to vibrate, and thus throw the strain of a jerk (from a horse) off a single lever and in part upon the other levers. By this arrangement the levers have a little sway—say eight inches. more or less—in a large machine, and when a horse is struck with the whip he cannot give a dead jerk upon the lever. The yokes H play like a double-tree and prevent the dead jerk, and at the same time the strain is thrown in part upon all the levers, thus preventing the side strain so liable to break the central pivot or throw the gearing out of place. The central pivot, L, with its conical base, and the bed-plate K are all cast in one piece. This conical pivot L is made hollow for the sake of greater strength with a small amount of metal, and the bed-plate is also very light and yet strong, being cast with an open center, as seen in Fig. 2, or with mere stays of metal running from near the center to the circumference of the main wheel. The journal-boxes S and the traveler O are secured to the bed-plate, as shown in Fig. 2. Upon the shaft Q of the universal joint P is a bevel-pinion, R, which gears into the main wheel A for communicating motion in the usual manner. The conical pivot L and the bed-plate K being in one piece, there is no trouble in planting or setting the machine when moved. The gearing is held in line by the peculiar bed plate, and it is impossible for the mechanic or the horses to disarrange the parts of the machine. The power may be turned bottom upward and suspended from the beams of a building or other support and yet work well.

Having thus fully described my invention, what I claim, and desire to secure by Letters Patent of the United States, is—

1. The vibrating yokes H, in combination with the levers D and the conical pivot L, substantially as set forth.

2. The hollow conical pivot L, when cast in one piece with the bed-plate K, extending so as to fix the gearing at the circumference of the main wheel A, substantially as specified.

SAMUEL B. HAINES.

Witnesses:
JOHN SCHAEFER,
J. FRANKLIN REIGART.